(12) United States Patent
Iijima et al.

(10) Patent No.: US 6,839,435 B1
(45) Date of Patent: Jan. 4, 2005

(54) RANKING DISPLAY METHOD FOR GAME MACHINE

(75) Inventors: Tsuyoshi Iijima, Tokyo (JP); Shinichi Odake, Tokyo (JP); Eiichi Saita, Tokyo (JP)

(73) Assignee: Namco Limited, Tokyo (JP)

( * ) Notice: Subject to any disclaimer, the term of this patent is extended or adjusted under 35 U.S.C. 154(b) by 0 days.

(21) Appl. No.: 09/329,652

(22) Filed: Jun. 9, 1999

(30) Foreign Application Priority Data

Jun. 12, 1998 (JP) .......................... 10-165609

(51) Int. Cl.[7] .............. H04K 1/00; A63F 9/24; A63F 13/00; G06F 11/30; G06F 12/14; G06F 17/00; G06F 19/00; H04L 9/00; H04L 9/32

(52) U.S. Cl. .................. 380/251; 463/29; 463/42; 713/152; 713/191; 713/201

(58) Field of Search .............. 380/251; 713/152, 713/191, 201; 463/42, 29

(56) References Cited

U.S. PATENT DOCUMENTS

| | | | | |
|---|---|---|---|---|
| 5,083,271 A | * | 1/1992 | Thacher et al. | 340/323 R |
| 5,558,333 A | * | 9/1996 | Kelson et al. | 463/1 |
| 5,765,149 A | * | 6/1998 | Burrows | 707/5 |
| 5,768,382 A | * | 6/1998 | Schneier et al. | 380/251 |
| 5,779,549 A | * | 7/1998 | Walker et al. | 463/23 |
| 5,823,879 A | * | 10/1998 | Goldberg et al. | 119/858 |

FOREIGN PATENT DOCUMENTS

| | | |
|---|---|---|
| JP | 58-157191 | 10/1983 |
| JP | 63-105783 | 5/1988 |
| JP | 4-310158 A | 11/1992 |
| JP | 06343759 A | 12/1994 |
| JP | 08117443 A | 5/1996 |
| JP | 09152999 A | 6/1997 |
| JP | 09294139 A | 11/1997 |

OTHER PUBLICATIONS

Larn V12.0; Fixed.Bugs, v 1.2 Mar. 3, 1995 08:33:03; Retrieved Oct. 17, 2003, http://orange.kame.net/dev/cvsweb.cgi/src/games/larn/Fixed.Bugs?rev=1.1&cvsroot=netbsd-sh3.*

* cited by examiner

Primary Examiner—Gilberto Barron
Assistant Examiner—Cas Stulberger
(74) Attorney, Agent, or Firm—Workman Nydegger

(57) ABSTRACT

Ranking display method for a game machine wherein, when a score along with an E mail address is inputted from a personal computer, a server stores the inputted score and E mail address, and when there is a change in ranking of score, the server transmits a message by E mail to the corresponding personal computer.

16 Claims, 4 Drawing Sheets

| RANKING | E MAIL ADDRESS | REGISTRATION DATA | SCORE |
|---------|----------------|-------------------|-------|
| AAAAAAAA | ○○○○○○ | 98.1.3 | XXXX |
| BBBBBBBB | △△△△△△ | 98.3.1 | YYYY |
| CCCCCCCC | ×××××× | 98.2.15 | ZZZZ |
| ⋮ | ⋮ | ⋮ | ⋮ |

RANKING DISPLAY METHOD FOR GAME MACHINE

This application is based on Patent Application No. 10-165609 (1998) filed Jun. 12, 1998 in Japan, the content of which is incorporated hereinto by reference.

BACKGROUND OF THE INVENTION

1. Field of the Invention

The present invention relates to a ranking display method for a game machine for indicating and displaying a score obtained by a player on the game machine.

2. Description of the Related Art

Heretofore, a ranking display system has been employed which, using a home page of internet or the like, accepts a registration of score from a player and indicates the score. A player who wishes indication on the home page connects to internet using a personal computer or the like to access a home page which is performing ranking indication by communication software for WWW (world wide web) called a browser. Here, when the player inputs the player's name and a score from a personal computer, a server storing the home page accepts the inputted name and score and describes them on the home page. The home page is a document written in HTML language (hyper text makeup language) in which, when a home page document of personal computer is transferred, the document is displayed in the form of an ordinary text by the function of the browser.

Since a prior art ranking display system merely accepts a score and name from a player and displays them, the player must access frequently to the home page in order to know whether or not there is a change in ranking of its own.

When an increased number of persons access to the home page, a burden is exerted on the server accepting the accesses, and there may occur a case where the player cannot easily access to the server of the home page.

SUMMARY OF THE INVENTION

In view of the above prior art problems, an object of the present invention is to provide a ranking display method for a game machine with which the player is sufficient to access to the home page only when there is a change in ranking of its own.

According to the present invention, in a ranking display method for a game machine wherein a server is connected to a communication line, score ranking information of the game machine is provided to a client accessing to the server through the communication line, the server provides steps of:

accepting a score of the game machine and an electronic mail address from the client;

storing the accepted score and electronic mail address in the server;

adding the received score into the ranking information;

detecting a score making a change in ranking by the addition; and transmitting a message showing occurrence of a change by electronic mail to an address shown by the electronic mail address corresponding to the score making the change in ranking.

According to the present invention, in the ranking display method for a game machine, the score may be encrypted along with identification information, the server decrypts the encrypted identification information and score, and determines requirement of addition of the score to the score ranking information on the basis of the decrypted identification information.

According to the present invention, in the ranking display method for a game machine, the game machine may encrypt and may print out a score at the time of game over and the identification information.

According to the present invention, in the ranking display method for a game machine the server when accepting the encrypted identification and score and the electronic mail address from the client, may make overlapping determination as to whether or not the same electronic mail address is stored internally, if presence of overlapping is determined, the score corresponding to the internally stored electronic address or the accepted score, whichever greater, is stored internally, whereby a plurality of scores are not allowed to the same electronic mail address.

According to the present invention, in the ranking display method for a game machine, a further comment may be accepted from the client and stored in relation to the score so that the comment is regarded as part of the ranking information.

According to the present invention, in a ranking display method for a game machine wherein a server is connected to a communication line, score ranking information of the game machine is provided to a client accessing to the server through the communication, the server provides a step of:

accepting a score of the game machine and an electronic mail address from the client.

According to the present invention, in the ranking display method for a game machine, the server may accept not only the score of the game machine but also other encrypted information.

According to the present invention, in the ranking display method for a game machine, the game machine may print out at least a score at the time of game over.

According to the present invention, in he ranking display method for a game machine, the server when accepting encrypted identification information, score, player's name and electronic mail address from the client, may perform an overlapping determination as to whether or not the same information as the player's name (hereinafter abbreviated to as player name) is internally stored, if presence of overlapping is determined, the score corresponding to the internally stored player name or the accepted score, whichever greater, is stored internally, whereby a plurality of scores are not allowed for a player of the same name.

According to the present invention, in the ranking display method for a game machine, a further comment may be accepted from the client and stored in relation to the score so that the comment is regarded as part of the ranking information.

According to the present invention, a server is connected to a communication line, and score ranking information of the game machine is provided to a client accessing to the server through the communication line.

In the present invention, since, when there is a change in ranking of score registered from a client, an electronic mail is transmitted, and the player is not required to access every time to the server. Further, at the server side, due to a reduction in the number of accesses, load on the server is reduced thereby preventing retardation of information processing services.

According to the present invention, the score to be registered can be verified by identification information added along with the score.

Further, according to the present invention, since encryption is carried out in the game machine and printed out, the player will never forget the encrypted information even in a case where the score is inputted by the client in a separate place.

Still further, according to the present invention, since only one score can be accepted for a same electronic mail address, burden of message transmission to the same person can be minimized for the server. Yet further, in the score ranking information display, scores of increased number of different persons can be displayed.

Yet further, according to the present invention, since a comment can be displayed in addition to the score, the player can be given a rising interest in ranking.

Yet further, according to the present invention, since the server receives the electronic address, it becomes possible to transmit information from the server to the client using the electronic mail address, thereby decreasing the number of accesses of the client.

Yet further, according to the present invention, by encryption of further information requiring secrecy such as identification information of the game machine, security of private information can be kept.

Yet further, according to the present invention, at least by printing the score, its own printed result provided by the server can be compared with the score to confirm the input of score for the client. Yet further, information other than score can also be printed out as necessary.

Yet further, according to the present invention, since overlap of score is not permitted for a same player, the time required for the client to search the score is reduced and the time required for the client to access the server is decreased.

Yet further, according to the present invention, since a comment is provided along with the score to the client, entertainingness of the game can be enhanced even further.

The above and other objects, effects, features and advantages of the present invention will become more apparent from the following description of the embodiments thereof taken in conjunction with the accompanying drawings.

BRIEF DESCRIPTION OF THE DRAWINGS

FIG. 5 is a diagram showing contents of score ranking data stored in the server 1.

DETAILED DESCRIPTION OF PREFERRED EMBODIMENTS

In the following, an embodiment of the present invention will be described in detail with reference to the drawings.

Figure 1:
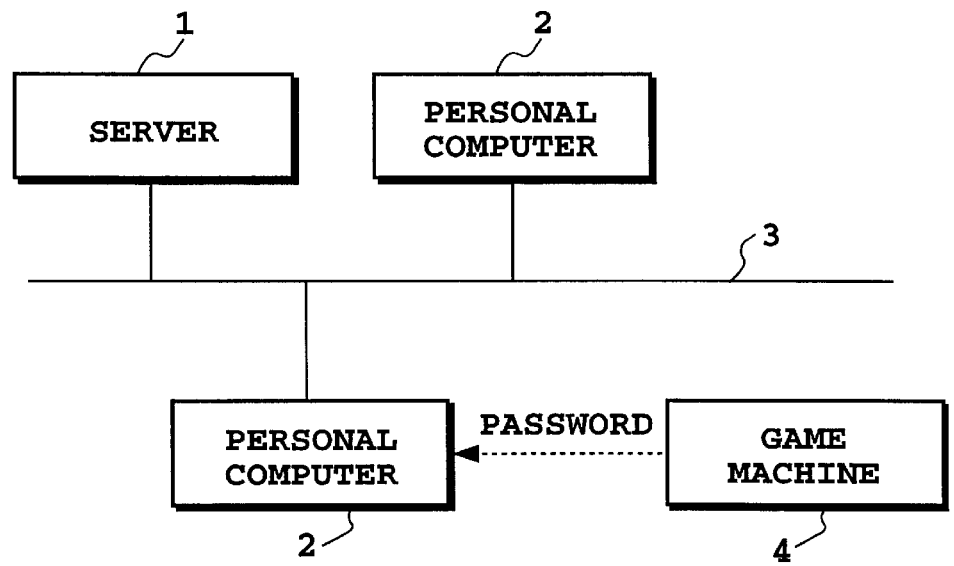
FIG. 1 is a block diagram showing the system construction of an embodiment of the present invention.
Figure 2:
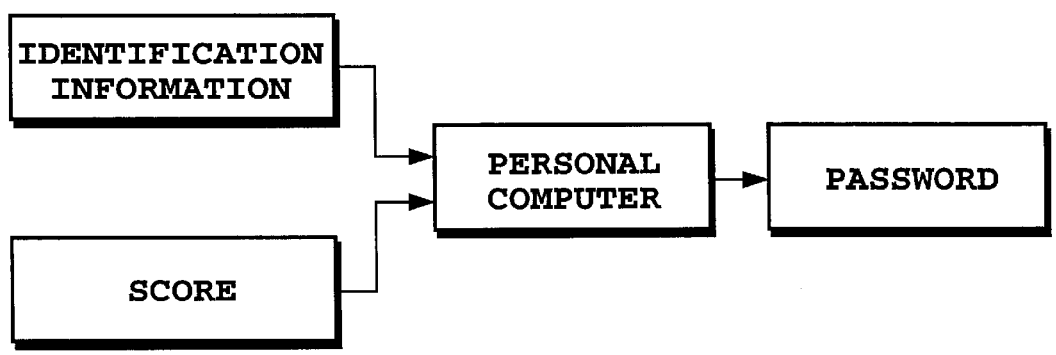
FIG. 2 is a diagram showing contents of encryption.

FIG. 1 shows a system construction example of a ranking display system to which the present invention is applied. In FIG. 1, a server 1 is disposed at a manufacturer of the game machine which stores a home page for ranking registration and data (score ranking information) in the form of a table shown in FIG. 5 used for ranking display, such as, in the present embodiment, name, E mail (electronic mail) address, registration date, and score. Further, a ranking registration program which is executed under linking with the home page and a ranking update program are also stored in the server. A personal computer 2 is used by a player. A game machine 4 can be those equipped in a game center or a home-use game machine. In the present embodiment, a different point from the prior art is that when a game is over, the score and identification information specific to that game are encrypted as shown in FIG. 2, a character string (called password) obtained as a result of the encryption is outputted in the form of a printed matter from the game machine 4.

The server 1 and the personal computer 2 are connected to a dedicated line 3 such as internet. Alternatively, the server 1 or the personal computer 2 may be connected to the dedicated line 3 through an internet connection service called a provider.

Figure 4:
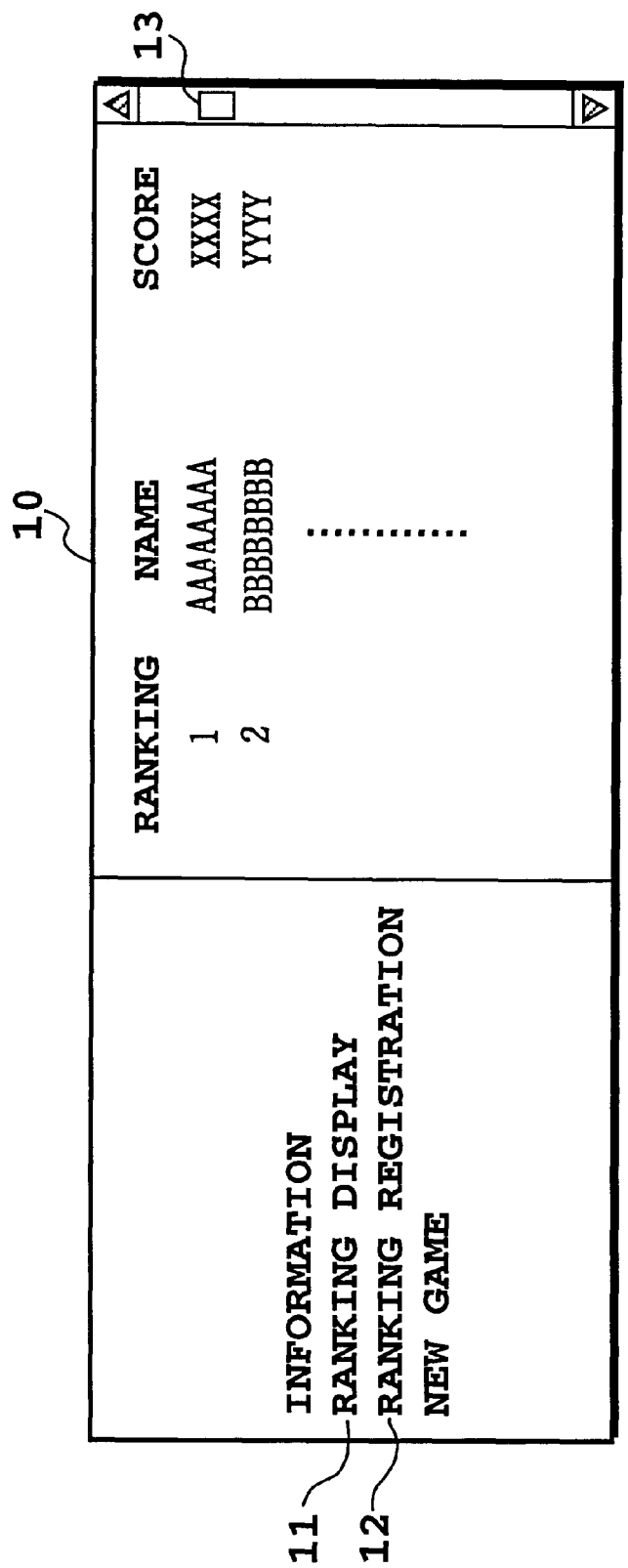
FIG. 4 is a diagram showing an example of score ranking display.

Before describing the operation of the above system, a display example of home page will be described. An example of home page is shown in FIG. 4. In FIG. 4, numeral 11 indicates a character string display for instructing display of ranking, in which, when the user instructs the character string 11 using a mouse of the personal computer 2, a ranking display program is transferred from the server 1 to the personal computer 2, which program is executed by the personal computer 2 to display ranking as shown in FIG. 5 on a screen area 10 of the personal computer 2. Numeral 12 is a character string for instructing ranking registration, when the character string 12 is instructed using the mouse, a ranking registration program is transferred to the personal computer 2, by which program the player performs registration of a score. In the display shown in FIG. 5, ranking display is illustrated schematically. By moving a scroll key 13, the display is scrolled, and all of the score ranking can be seen.

On the basis of the above points, system operation of FIG. 1 is described. After the player plays a game on the game machine 4 and obtains a printed result having a printed password, the player uses the personal computer 2 to access the home page on the server 1 as in the prior art.

Then, a display screen as shown in FIG. 4 appears, and the player instructs the character string 12.

Figure 3:
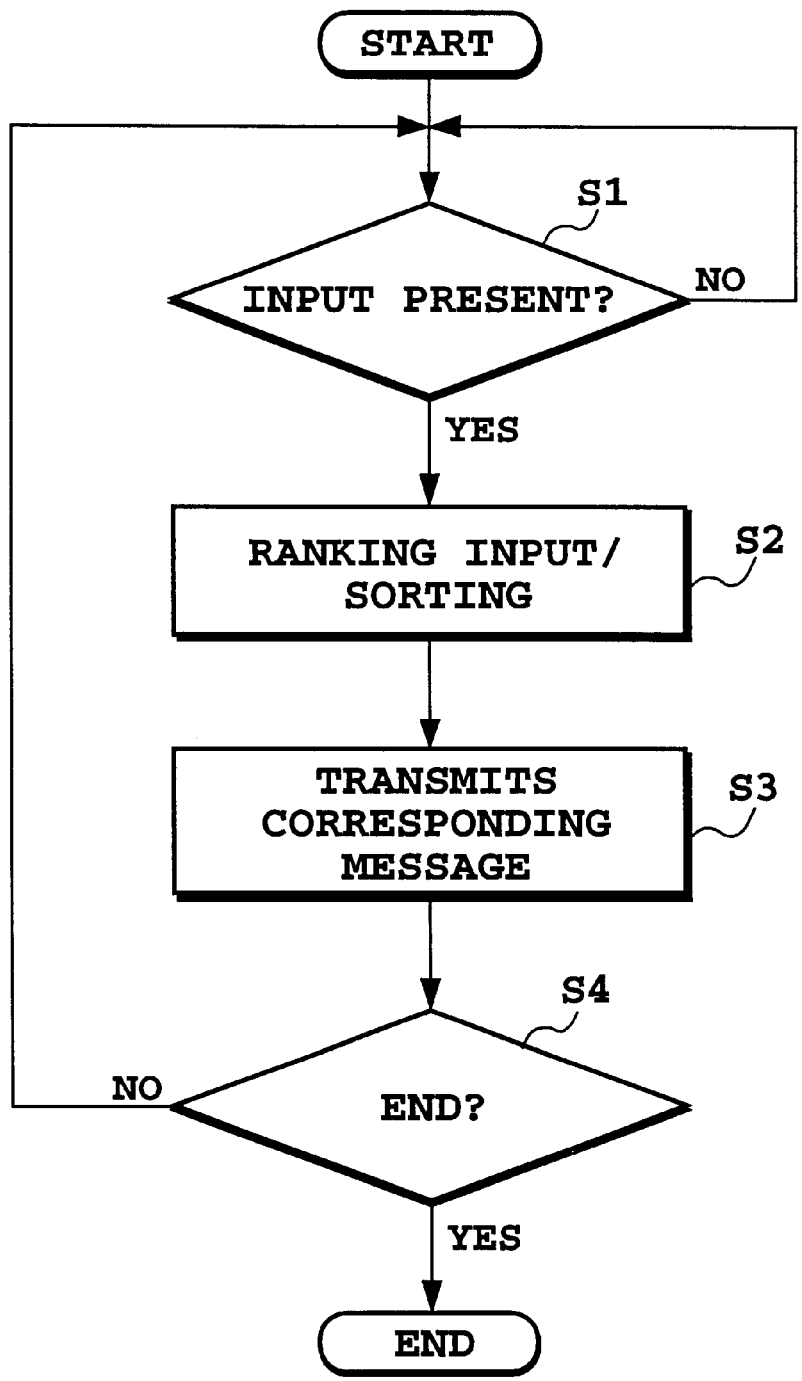
FIG. 3 is a flow chart showing processing steps executed by a server 1.

According to the flow chart shown in FIG. 3, the server 1 waits for registration instruction from the personal computer 2 (loop processing in step 1 of FIG. 3). When the registration instruction is detected in step S1, the server 1 transfers the ranking registration program to the personal computer 2. The personal computer 2 executes the ranking registration program to accept keyboard inputs from the player including name, password, comment and E mail address. The inputted name, comment and E mail address are transferred to the server 1. The server 1 stores the transferred name, password, comment, and E mail address correlatingly with each other, and then executes ranking update (step S2).

First the server performs decoding (decryption) of the received password. Since encryption method is the same as the prior art method, detailed description thereof will be unnecessary. From identification information obtained by decryption and identification information in the score, determination is made as to whether or not the game has been performed correctly by the game machine 4. If a forged password is used, identification information obtained by decryption is, for example, data format thereof is different from the correct one, whereby the forged password is excluded. When the verification of the correct password is completed, the server determines whether or not the following registration condition is satisfied, when the registration condition is satisfied, the received data is registered in a ranking data table of an internal storage device.

Registration Condition

1. Name and/or E mail address is new one.

Presence of overlapping can be determined by searching the ranking data table.

2. When the name and/or E mail address is already registered in the ranking data table, the received score data is greater than the registered score.

When overlapping is found by searching the ranking data table, determination is made by comparing the values of the score data.

When a determination is made using the above registration condition and the server 1 determines satisfaction of the registration condition, sorting (rearrangement) is performed according to the score data (FIG. 5). In the case of registration of a new score, the received data is newly and additionally registered according to the score ranking. When the name and/or E mail address overlaps, the written data on the ranking table is deleted, and the received data is registered.

In the present embodiment, for a player who has made ranking registration, the following message in relation to ranking registration is prepared in a storage device in the server 1, and an E mail describing the message is immediately transmitted to the player's E mail address (step S3 in FIG. 3).

a) New Ranking Registerer

A message notifying that ranking registration was made, and if there is a change in ranking, it will be notified by an E mail, is transmitted by E mail.

b) The Person Having a Registered Ranking and Whose Present Score Will be an Upper Ranking A message is transmitted for notifying a change in ranking and informing a new score ranking.

A ranking change (change to a lower ranking) can be found by the following information processing.

Since the ranking data table shown in FIG. 5 is arranged in the order of score, the data shown by the received data is compared with the ranking data table one by one starting with the highest score. When the comparison data at the ranking data table is greater than the score of the received data, the ranking is unchanged. On the contrary, when the score of the received data is greater, for example, than the score of the third ranking of the ranking data table, ranking of all ranking registration data on and after the present third ranking is moved down in order. Therefore, the received data is inserted between the present second ranking registration data and the third ranking registration data, and E mail addresses of all the ranking data of the present third and after are taken out. As for the ranking, the present stored address is converted into ranking to obtain new ranking.

With the above description, it will be possible for an ordinary skill in the art to prepare a program for carrying out this processing.

c) The Person Having a Registered Ranking Whose Present Score to be Registered is Below the Registered Score A message describing ranking update disable is transmitted. Alternatively, the message may be displayed on the personal computer screen at the time of score registration request.

When the server 1 transmits an E mail of a message corresponding to the above-described ranking registration contents, registration completion is transmitted to the personal computer 2. The execution procedure of the server 1 returns to step S1 of FIG. 3 through S3, and prepares for ranking registration from another personal computer 1. Further, when there is an instruction of processing end to the server 1 (YES in step S4), processing in FIG. 3 is ended.

On the other hand, in the player's personal computer 2, when a notice of ranking registration end is received from the server 1, the browser is ended to terminate ranking registration processing.

As described above, in the present embodiment, since, when there is a change in ranking by ranking registration of other players, a message according to the contents of the change is transmitted by E mail to the ranking registerer, the player is not necessary to access the home page every time. Further, since, in the password provided from the game machine 4 the score and identification information are encrypted, only one having the proper password is allowed to make ranking registration. Since the password is printed, the player will never forget the password.

Processing for score registration has been described above. When the server 1 accepts an access from the personal computer 2 and receives an instruction for ranking display of FIG. 4, score, name and comment are read from the ranking data table stored in the order of score internally (for example, a hard disk storage device) to display as shown in FIG. 4 (comment is not shown).

In addition to the above-described embodiment, the following embodiments can be carried out.

1) In the above-described embodiment, a wide area communication network called internet, however, alternatively, the present invention can be applied to any computer network systems which can perform message communications such as E mails. For example, a dedicated telephone line possessed by an information service firm may be used, or a dial connection may be used from the personal computer 2 to the server 1 using a public telephone line.

2) The message transmitted by E mail may be determined appropriately according to the type of game. Further, it is considered that a player who stays in an upper position of ranking for a certain period of time is automatically detected, and the game machine manufacturer provides a premium to the player. In this case, the registration date is described in the ranking data registration table, and the period between the present date and the registration date of a high ranking player can be calculated to detect an appropriate one.

3) In the above embodiment, when a variation occurs in ranking, an E mail is immediately transmitted, however, alternatively, such variation may be totalized for a certain period of time, for example, a day or a week. In this case, both the ranking at the preceding totalization date and the ranking at the present totalization date are stored in the ranking data table.

4) In the above embodiment, the password is offline transferred between the game machine 4 and the personal computer 2, however, alternatively, the password may be transferred by communication by means of cable connection, or the game machine be connected to internet and communication effected between the game machine 4 and the server 1. In this case, the game machine 4 is provided with means for inputting information such as communication device, name and the like (keyboard or the like).

Further, as a transfer method of password to the personal computer 2, it is considered to use portable storage media such as a floppy disk, an IC card, and a memory card.

5) In the above embodiment, score ranking is displayed for a single type of game machine, however, it is also possible to display ranking for each game type. In this case, game type information is included in the information to be encrypted, and the game type is determined when the encrypted password is received at the server 1 side.

6) In the above embodiment, a general-purpose browser is used to register the score, however, alternatively, the game machine manufacturer may provide dedicated communication software for score registration, for example, in the form of a CDROM. In this case, the identification information is specified in the communication software. When the personal computer 2 executes the communication software, the score is accepted, and the identification information and the score are transmitted to the server 1. To prevent a forged score from being registered, the game machine stores the score on a floppy disk or the like, and the score stored on the floppy disk is read by the personal computer 2 using the above communication software.

7) In addition to the personal computer 2, a machine used to access the server 1 (in general, called a client or terminal) can be one of machines having communication function, such as an electronic notebook, word processor, work station, and the like.

8) In the above embodiment, mail notification is made to all of the score registerers, however, alternatively, mail notification may be limited in the range, for example, only to top one, or first to tenth ranking. In this case, the server 11 performs determination of variation in ranking only for a predetermined range of ranking.

9) The number of score registration times is stored, and the count result may be displayed together with the score. In this case, the number of registration times is stored in the ranking data table at the server 1 side, and the value of registration times may be incremented by 1 at every registration from the personal computer 2. It is further considered that various guidance information, advertising information and comments are E mailed according to the number of registration times.

10) When the E mail function of the server 1 of the present embodiment is used, comments of information inputted from score registerers can also be E mailed by broadcast communication to players of a range of upper ranking.

11) In the above embodiment, the server 1 unconditionally performs transmission of E mail, however, alternatively, requirement of E mail may be instructed from the personal computer 2 to the server 1. This instruction is described together with the score in the ranking data table, for example, in the form of bit 1/0, and the server 1 performs E mailing based on the data.

Further, the upper ranking players receiving E mails in paragraph 10) above are also possible to make requirement of E mail reception selectable.

12) Some browser for WWW has a function called a "cookie", that is, a function to store information transmitted from the server in the own unit and process the information according to HTML document or program (or script) sent from the server. Using this function, the player is possible to store the same information as the score and E mail address registered in the server 1 by the player, and at every time the home page for ranking display is accessed, the home page and these information (E mail address, score) are combined and displayed.

Further, it is also possible that the number of own access times to the home page is counted by the cookie function at the personal computer 2 side, and the count result is displayed on the personal computer 2.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A ranking display method for a game machine wherein a server is connected to a communication line, score ranking information of said game machine is provided to a client accessing to said server through said communication line, said server comprising steps of:

accepting a score of the game machine and an electronic mail address in said server;

storing the accepted score and electronic mail address in said server;

adding the received score into the ranking information;

detecting a score making a change in ranking by the addition; and transmitting a message showing occurrence of a change by electronic mail to an a mail address shown by the electronic mail address corresponding to the score making the change in ranking;

wherein said transmitting comprises a step for selecting a mail address from the stored mail addresses corresponding to the detected score to obtain at least one electronic mail address to be used in said transmitting and said message is not transmitted to the mail addresses in which the corresponding scores stored do not make the change in ranking.

2. The ranking display method for a game machine as claimed in claim 1, wherein said score is encrypted along with identification information, said server decrypts the encrypted identification information and score, and determines requirement of addition of said score to said score ranking information on the basis of said decrypted identification information.

3. The ranking display method for a game machine as claimed in claim 2, wherein said game machine encrypts and prints out a score at the time of game over and said identification information.

4. The ranking display method for a game machine as claimed in claim 2, wherein said server when accepting the encrypted identification and score and the electronic mail address from said client, makes overlapping determination as to whether or not the same electronic mail address as the received electronic mail address is stored internally, if presence of overlapping is determined, the score corresponding to the internally stored electronic mail address or the accepted score, whichever is greater, is stored internally, whereby a plurality of scores are not allowed to the same electronic mail address.

5. The ranking display method for a game machine as claimed in claim 1, wherein a comment is accepted from said client and stored in relation to said score so that said comment is regarded as part of said ranking information.

6. A ranking display method for a game machine, wherein a server is connected to a communication line, score ranking information of said game machine is provided to a client accessing to said server through said communication, said server comprising steps of:

accepting a score of said game machine and an electronic mail address from said client; and when at least one of said score, said electronic email address, and a player name is received from the client encrypted, performing an overlapping determination as to whether or not the same information as said player's name is internally stored, if presence of overlapping is determined, the score corresponding to the internally stored player name or the accepted score, whichever greater, is stored internally, whereby a plurality of scores are not allowed for a player of the same name.

7. The ranking display method for a game machine as claimed in claim 6, wherein said server accepts not only the score of said game machine but also other encrypted information.

8. The ranking display method for a game machine as claimed in claim 7, wherein said game machine prints out at least a score at the time of game over.

9. The ranking display method for a game machine as claimed in claim 6, wherein a further comment is accepted from said client and stored in relation to said score so that said comment is regarded as part of said ranking information.

10. The ranking display method for a game machine as claimed in claim 1, wherein the step of transmitting the message comprises transmitting the message exclusively to the address shown by the electronic mail address corresponding to the score making the change in ranking.

11. The ranking display method for a game machine as claimed in claim 1, wherein the received score is added into the ranking of a plurality of scores, each score having a corresponding electronic mail address, the step of transmitting the message comprising transmitting, by electronic mail, a message showing occurrence of a change in the ranking, the message being transmitted only to those electronic mail addresses corresponding to scores whose rank has changed as a result of the ranking of the received score.

12. A ranking display method for a game machine wherein a server is connected to a communication line, score ranking information of said game machine is provided to a client accessing to said server through said communication line, said server comprising steps of:

accepting a plurality of scores and a plurality of electronic mail addresses, each of the plurality of electronic mail addresses corresponding to one of the plurality of scores;

storing the accepted plurality of scores and plurality of electronic mail addresses in the server;

ranking each of the accepted scores;

accepting a new score and corresponding electronic mail address;

ranking the new score relative to the ranked plurality of scores;

identifying the scores whose rank has changed as a result of the ranking of the new score; and transmitting, by electronic mail, a message showing occurrence of a change in ranking, the message being transmitted only to those electronic mail addresses corresponding to scores whose rank has changed as a result of the ranking of the new score.

13. The ranking display method for a game machine as claimed in claim 12, wherein the new score is encrypted along with identification information, the server decrypts the encrypted identification information and the new score, and determines requirement of ranking of the new score on the basis of the decrypted identification information.

14. The ranking display method for a game machine as claimed in claim 13, wherein said server when accepting the encrypted identification and new score and the electronic mail address, makes overlapping determination as to whether or not the same electronic mail address as the electronic mail address associated with the new score is stored internally, if presence of overlapping is determined, the score corresponding to the internally stored electronic mail address or the new score, whichever is greater, is stored internally, whereby a plurality of scores are not allowed to the same electronic mail address.

15. The ranking display method for a game machine as claimed in claim 12, wherein a comment is accepted and stored in relation to the new score so that the comment is regarded as part of ranking information associated with the new score.

16. The ranking display method for a game machine as claimed in claim 12, wherein the step of transmitting of the message showing occurrence of a change in ranking may take place while one or more clients are still playing the game with which the score ranking information is concerned.

* * * * *

UNITED STATES PATENT AND TRADEMARK OFFICE
CERTIFICATE OF CORRECTION

PATENT NO. : 6,839,435 B1
DATED : January 4, 2005
INVENTOR(S) : Iijima et al.

It is certified that error appears in the above-identified patent and that said Letters Patent is hereby corrected as shown below:

Title page,
Item [56], References Cited, OTHER PUBLICATIONS,
"Larn" reference, change "Mar. 3," to -- Mar. 20, --.

Column 1,
Line 25, after "(hyper text" change "makeup" to -- markup --.
Lines 32 and 43, after "its own" insert -- score --.
Lines 33 and 36, after "access" remove "to".
Line 41, change "sufficient to" to -- able to --.
Line 42, before "the home page" remove "to".

Column 2,
Line 6, after "game machine" insert -- , --.
Line 6, after "the server" insert -- , --.
Line 9, change "internally, if" to -- internally. If --.
Lines 23 and 50, after "client accessing" remove "to".
Line 33, before "ranking display" change "he" to -- the --.
Line 34, after "the server" insert -- , --.
Line 54, before "the player" remove "and".

Column 3,
Line 3, before "increased number" insert -- an --.
Line 12, before "the client." change "of" to -- by --.
Line 19, change "of score" to -- of the score --.
Line 27, change "entertainingness" to -- the entertainment --.

Column 4,
Lines 5 and 6, before "home page" insert -- the --.
Line 13, after "ranking registration" change "," to -- . --.
Line 14, change "when the" to -- When the --.
Line 40, before "encryption method" insert -- the --.
Line 47, change "data format thereof is" to -- of a data format --.
Line 55, after "is new" remove "one".

Column 5,
Lines 12-13, change "it will be notified by an E mail, is transmitted by E mail." to -- the player will be notified by a transmitted Email. --.
Line 33, after "will be possible for" change "an" to -- a person of --.
Lines 57-58, change "the player is not necessary" to -- whereby it is not necessary for the player --.

UNITED STATES PATENT AND TRADEMARK OFFICE
CERTIFICATE OF CORRECTION

PATENT NO. : 6,839,435 B1
DATED : January 4, 2005
INVENTOR(S) : Iijima et al.

It is certified that error appears in the above-identified patent and that said Letters Patent is hereby corrected as shown below:

Column 6,
Line 6, change "internet, however," to -- the internet is used. However, --.
Line 23, change "transmitted, however," to -- transmitted. However, --.
Lines 30-31, change "computer 2, however," to -- computer 2. However, --.
Line 33, after "game machine" insert -- may --.
Line 33, after "connected to" insert -- the --.
Line 38, change "transfer method of password" to -- a method of transferring the password --.
Line 39, change "considered" to -- possible --.
Line 48, change "the score, however," to -- the score. However, --.
Line 67, change "only to top" to -- of only to the top --.

Column 7,
Line 18, change "E mail, however," to -- E mail. However, --.
Lines 25 and 31, change "possible" to -- able --.
Line 27, change "browser" to -- browsers --.
Line 27, after "WWW" change "has" to -- have --.
Line 29, change "own unit" to -- individual unit --.
Line 30, before "HTML document" insert -- an --.
Line 35, change "these information" to -- this information --.
Line 37, after "the number of" remove "own".

Column 8,
Line 17, after "said server" insert -- , --.
Line 21, change "internally, if" to -- internally, wherein if the --.
Line 33, after "communication" insert -- line --.

UNITED STATES PATENT AND TRADEMARK OFFICE
CERTIFICATE OF CORRECTION

PATENT NO. : 6,839,435 B1
DATED : January 4, 2005
INVENTOR(S) : Iijima et al.

It is certified that error appears in the above-identified patent and that said Letters Patent is hereby corrected as shown below:

Column 10,
Line 6, after "said server" insert -- , --.
Line 11, change "internally, if" to -- internally, wherein if the --.

Signed and Sealed this

Twenty-ninth Day of November, 2005

JON W. DUDAS
*Director of the United States Patent and Trademark Office*